United States Patent [19]

Heilenbach

[11] 4,077,739
[45] Mar. 7, 1978

[54] ENGINE TURBOCHARGER TURBINE INLET SCREEN

[75] Inventor: James W. Heilenbach, Riverside, Ill.

[73] Assignee: General Motors Corporation, Detroit, Mich.

[21] Appl. No.: 752,394

[22] Filed: Dec. 20, 1976

[51] Int. Cl.$^2$ .................. F01D 15/00; F02B 37/00
[52] U.S. Cl. .................. 415/121 G; 60/39.09 P; 60/605; 55/511; 55/529
[58] Field of Search .................. 60/39.09 P, 597, 605; 415/121 G; 55/307, 511, 529

[56] References Cited

U.S. PATENT DOCUMENTS

| | | | |
|---|---|---|---|
| 3,286,459 | 11/1966 | Ephraim | 60/39.09 P |
| 3,352,104 | 11/1967 | Duerr | 60/39.09 P |
| 3,735,587 | 5/1973 | Addie et al. | 60/39.09 P |

Primary Examiner—Carlton R. Croyle
Assistant Examiner—L. J. Casaregola
Attorney, Agent, or Firm—Robert J. Outland

[57] ABSTRACT

An improved turbine inlet screen for protecting the inlet to the turbine of an engine turbosupercharger and exposed to numerous substantial and rapid variations in exhaust gas temperature. The screen comprises a circular metal plate having an improved pattern of annularly arranged perforations providing radially non-linear mass relations from the plate center to its edge selected to reduce maximum thermal stresses, particularly at the plate edge, during transient gas temperature conditions.

4 Claims, 8 Drawing Figures

ENGINE TURBOCHARGER TURBINE INLET SCREEN

This invention relates to engine exhaust turbine inlet screens for protecting the exhaust turbine from the entry of potentially damaging foreign matter and, more particularly, to a plate type inlet screen having an improved pattern of perforations arranged to minimize internal stresses in the screen plate which are caused by the varying exhaust gas temperatures of transient engine operation.

U.S. Pat. No. 3,286,459 Ephraim, Jr., assigned to the assignee of the present invention, discloses in FIGS. 1-4 certain engine exhaust turbine inlet screen arrangements. In these arrangements, the screen is formed of a perforated metal plate having a triangular pattern of equally spaced perforations extending throughout the complete surface of the plate. The plate is supported within a housing defining the engine exhaust gas flow path by a frusto-conical support member shown in FIG. 4 as having a slotted body with a solid annular edge to which the circular edge of the plate is welded. The edge of the plate and its support member are spaced slightly from the surrounding housing to permit the screen and its support to expand and contract relative to the housing due to changes in temperature during operation.

While arrangements of this sort have been very successful in operation, it has been found through experience that in modes of engine operation involving numerous load, or throttle, changes with resulting transient exhaust gas temperature conditions, the service life of the screen plates is limited by cracking failures which occur, usually at or near the edge of the screen after an extended period of service.

Numerous proposals have been made for arrangements to improve screen service life under such conditions, such as are shown for example in the other embodiments of screen support means disclosed in U.S. Pat. No. 3,286,459, as well as by the arrangement shown in a subsequent U.S. Pat. No. 3,735,587 Addie and Freitag, which is also assigned to the assignee of the present invention. It has been recognized that the limited transient life condition of the screens results from the repetitive development of excessive stress levels at the screen edge during transient operating conditions. However, a longer life arrangement that provides a commercially acceptable substitute for the present arrangement has not previously been developed.

The present invention provides a turbine inlet screen of the plate type disclosed in the previously mentioned U.S. Pat. No. 3,286,459, but having an improved pattern of perforations which provides a significant reduction in stress levels at the plate edge during transient engine operation. The improved perforation pattern involves a plurality of radially spaced concentric annular rings of perforations which terminate short of the screen edge and cover substantially the entire screen area in a nonlinear pattern that provides radially variable localized mass distribution of the remaining plate material after perforation, with the mass variations being arranged to reduce transient stresses at the plate edge, as compared to the previous hole pattern arrangements.

The novel perforation pattern has two features which are directed to the reduction of stresses at the plate edge. The first is that the pattern of holes or perforations terminates, radially inward of the plate edge, in an annular row of perforations which are spaced equally from the edge of the plate and thus provides a relatively constant distribution of mass at and adjacent to the edge of the plate. This is an improvement over the previous triangular hole pattern which provided hole locations along the plate edge at varying distances therefrom. This resulted in variations in the concentration of stresses and the strengths of the screen edge portions that were considered to cause localized higher stress conditions at specific locations where failure might be originated.

A second feature of the plate design is a radially variable mass distribution which is arranged in a manner to provide a higher than average localized plate mass in a portion surrounding the screen center, a lower than average localized screen mass in an intermediate portion between the center and the edge and a radially outwardly increasing screen mass in a peripheral portion of the screen adjacent its edge. This basic pattern distribution may be varied, as shown in the specific embodiment to be subsequently described, to incorporate additional reversals of mass distribution extremes intermediate the center and peripheral portions of the plate.

In every case, the localized areas of higher than average mass distribution provide heat sinks which have a slower temperature response to transient engine operating conditions and their resultant exhaust gas temperature changes than do the alternating localized annular areas or zones of lower than average screen mass. This permits internal heat flow within the screen not only outwardly to the supporting member which inherently has a high mass, but also inwardly during transient conditions from a high response zone of lower mass to a lower response zone of higher mass. This bi-directional heat flow during transient conditions tends to lower the overall differential temperature across the plate and the resultant development of stresses at various locations in the plate, which stress development is felt to be cumulative at the plate edge. Thus, the overall transient stresses developed at the plate edge are lowered by the unequal radial mass distribution provided by the perforation pattern.

Part of this result is attributable particularly to the higher than average mass distribution in the plate central portion, which reduces its transient response and the resultant rate of stresses developed therein with their cumulative effect at the plate edge. This also permits the central portion to provide a temporary heat sink, drawing heat from the adjacent lower than average mass area during increasing temperature gradients and supplying heat to the adjacent area during decreasing temperature gradients.

Another aspect of the variable perforation pattern is a radially increasing localized mass distribution adjacent to the plate edge. This also contributes to lower stresses by providing a smooth transition between the inherently high mass annular support portion to which the plate is connected and the lower mass perforated body of the plate inwardly of the edge.

These and other features and advantages of the invention will be more fully understood from the following description of a preferred embodiment taken together with the accompanying drawings.

Figure 3:
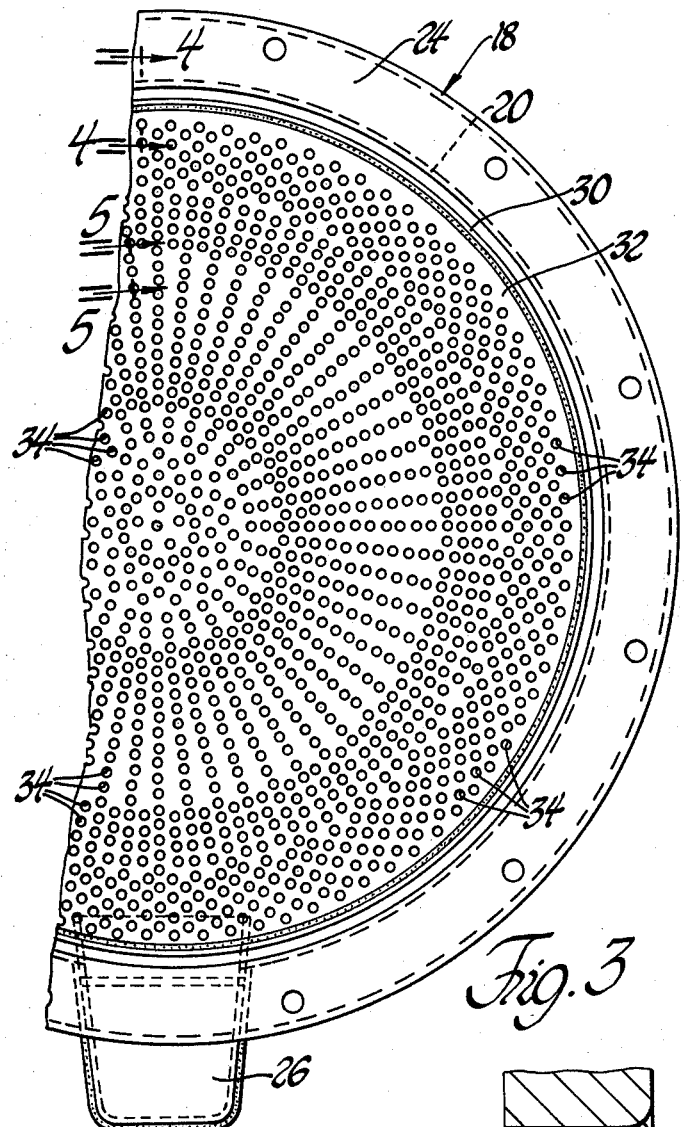
FIG. 3 is a fragmentary end view of the screen assembly of FIGS. 1 and 2 as viewed from the plane indicated by the line 3—3 of FIG. 2.
Figure 4:
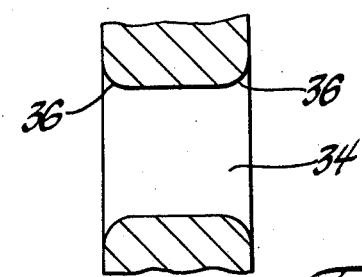
Figure 5:
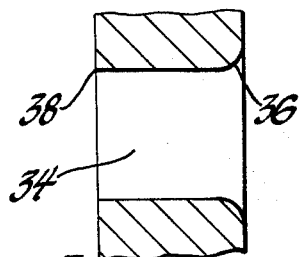
Figure 6:
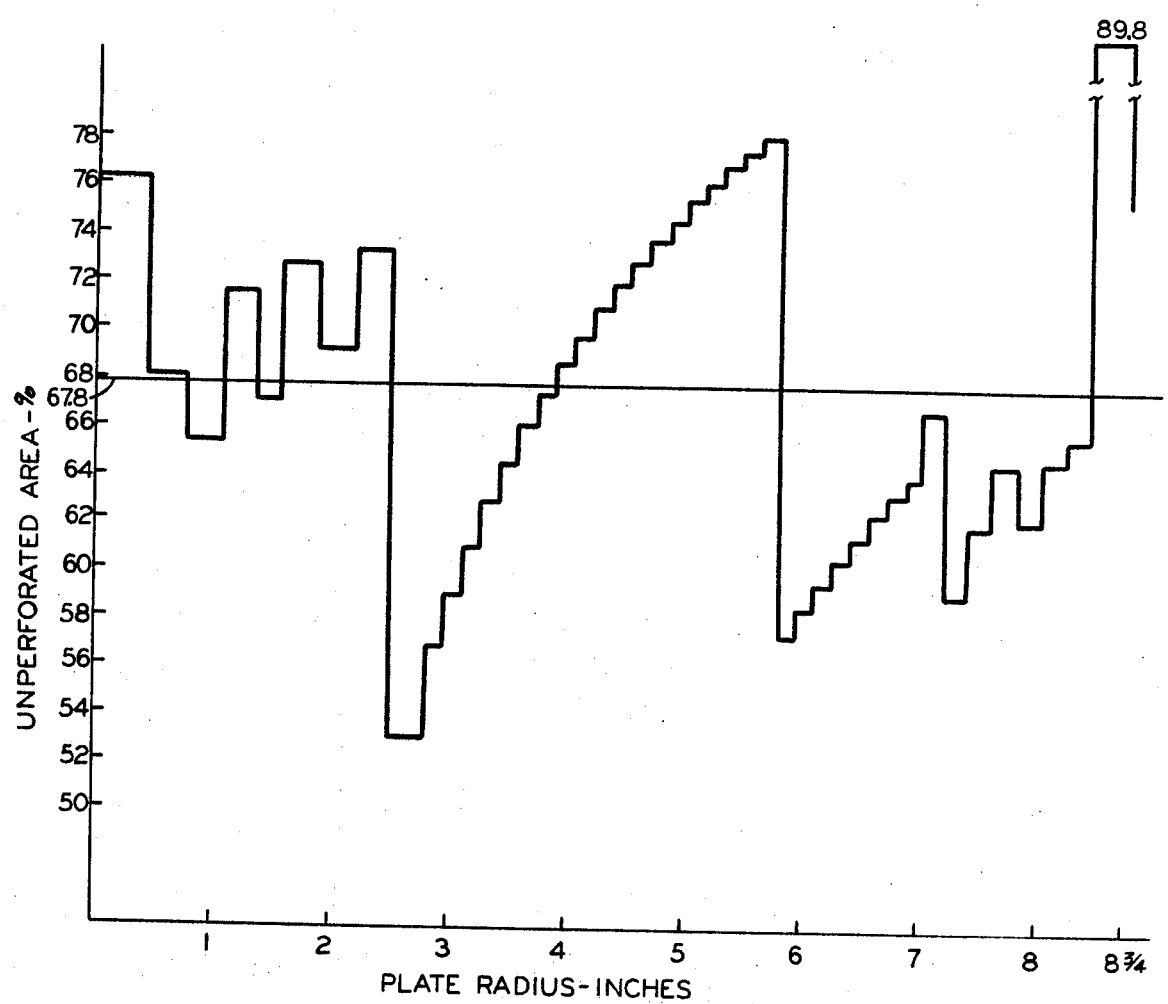
Figure 7:
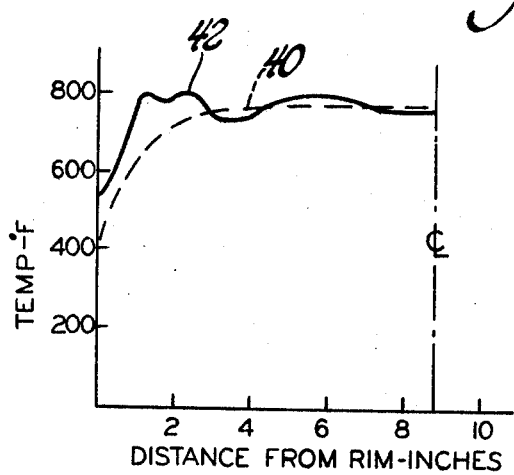
Figure 8:
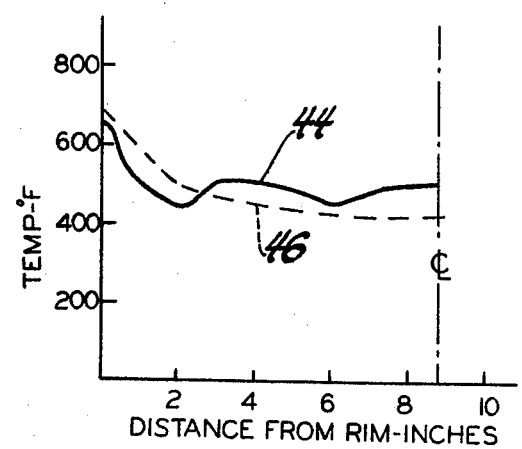

FIGS. 4 and 5 are enlarged cross-sectional views taken in the planes indicated by lines 4—4 and 5—5 of FIG. 3 showing the forms of individual perforations in specific areas of the screen;

FIG. 6 is a graphical presentation illustrating the localized radial variations in mass distribution provided by the hole pattern of the plate shown in the embodiment of FIGS. 1-5; and FIGS. 7 and 8 are graphical presentations illustrating the comparative results of temperature measurements made during comparative transient conditions of engine operation with screen plates having perforation patterns of the prior art triangular type and the improved type of the present invention.

Figure 1:
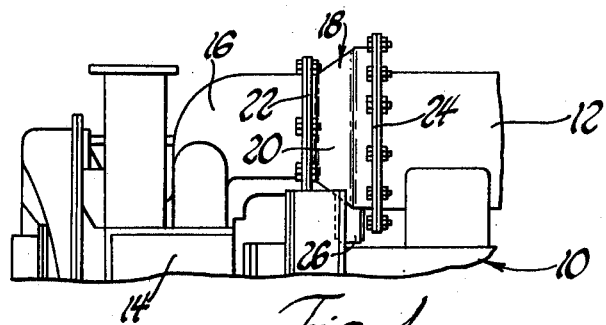
FIG. 1 is a fragmentary plan view of an internal combustion engine having an exhaust driven turbosupercharger wherein the turbine is protected by an inlet screen assembly having a screen formed according to the present invention.

Referring first to FIG. 1 of the drawings, there is shown an internal combustion engine generally indicated by numeral 10 and including an exhaust manifold 12 with a turbocharger 14 adapted to be driven by exhaust gases discharged by the engine 10 through the manifold 12. The turbocharger (also known as a supercharger or turbosupercharger) operates in known manner to compress the inlet air delivered to the engine. It includes an exhaust gas driven turbine fed through an inlet scroll 16 which is connected with the engine exhaust manifold 12 by an inlet screen assembly 18.

Figure 2:
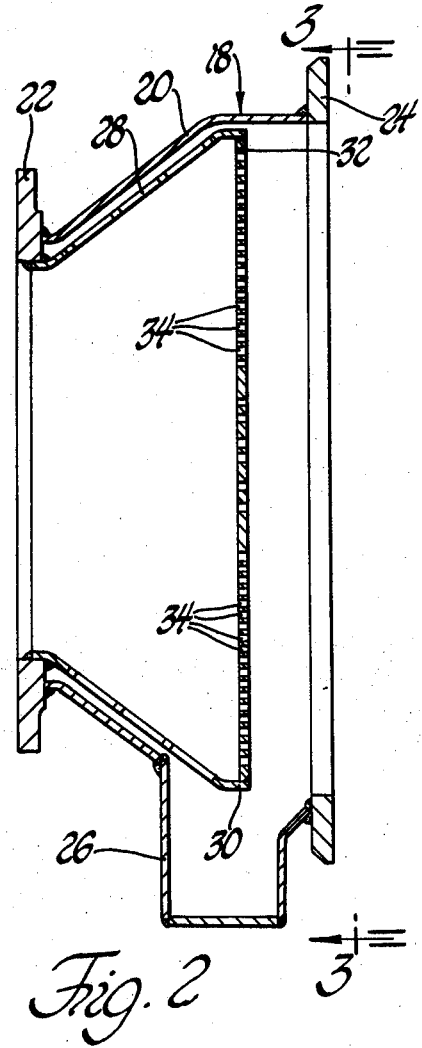
FIG. 2 is a cross-sectional view of the turbine screen inlet assembly utilized in the engine of FIG. 1.

In FIGS. 2 and 3, the construction of the screen assembly 18 is shown in further detail. The assembly includes a housing made up of a generally part cylindrical and part frusto-conical tube section 20 connected at its ends with a pair of flanges 22, 24 adapted to be bolted respectively to the turbine inlet scroll 16 and the engine exhaust manifold 12. At the bottom of the tube section 20 there is provided a depending cup or trap portion 26 arranged to collect foreign matter separated from the exhaust gas stream by the screen assembly.

Welded to the interior of the flange 22 is a generally frusto-conical slotted support member 28 which extends within but spaced from the tube section 20 of the housing. Member 28 terminates within the housing in an annular edge portion 30 in which is welded a circular perforated plate forming a turbine inlet screen 32 according to the present invention. Plate 32 is formed of a high temperature resistant material, such as stainless steel, and has a substantial thickness to provide sufficient strength to prevent the screen from being damaged by foreign objects in the exhaust stream, which may strike the screen and be separated from the gas stream, falling into the trap 26.

In the present instance, the screen 32 is made of number 3 gage stainless steel plate having a minimum one-quarter inch thickness and an outer diameter of 17½ inches. These dimensions are, of course, variable to suit the size and conditions of the particular engine and exhaust turbocharger system with which the screen is to be used. For convenience, it is preferable to use a flat plate configuration as shown by plate 32. However, it should be understood that, if desired, the plate could have a curved configuration having, for example, a shape like that of the plate 30 illustrated in U.S. Pat. No. 3,735,587.

The novel screen comprised by plate 32 differs from the prior art arrangement shown in U.S. Pat. No. 3,286,459 primarily in the arrangement or pattern of perforations 34 which extend over substantially all of the plate surface inwardly of the edge. The pattern is made up of a plurality of radially spaced annular rings of perforations which are centered at the center of the screen and concentric with its edge. In the illustrated embodiment, equally sized perforations are utilized. However, it should be understood that, if desired, it would be possible to incorporate perforations of varying sizes within the scope of the broader aspects of the present invention.

The disclosed perforation pattern begins with a single central perforation at the center of the screen surrounded by closely spaced perforation rings of increasing diameter and with the perforations spaced both in annularly and radially aligned and staggered fashion to provide a pattern that leaves a radially varying amount of remaining plate mass in various annular bands or portions of the plate, progressing from the center to the outer edge.

FIGS. 4 and 5 illustrate the cross-sectional configurations of perforations in various portions of the plate as indicated by the line 4—4 and 5—5 of FIG. 3. The perforations in the outer rings near the edge of the plate, shown in FIG. 4, being in a more highly stressed zone under transient conditions are provided with radiused edges 36 on both sides of the plate in order to reduce the possibility of stress cracks being initiated at sharp edges. The perforations located on the inner rings, from about a seven inch radius inwardly, are shown in FIG. 5 to have radiused leading edges 36, but sharp trailing edges 38, since it is felt that the stress levels in these areas are not sufficiently great to require backside removal of the sharp perforation edge.

FIG. 6 illustrates graphically the remaining unperforated area of plate surface lying in each of the bands formed by the adjacent rings through the centers of the annular rows of perforations from the center of the plate outward. As is shown, the central portion of the plate extending out to a radius of 2½ inches has hole patterns and spacing which result in a remaining plate surface area, and resultant mass, that varies considerably from one band to the next, but averages substantially above the average mass per unit area for the overall perforated plate member. Beyond the 2½ inch radius, the localized plate mass per unit area is rapidly decreased by the inclusion of an extra staggered row of perforations between each pair of radial rows provided inwardly thereof. Thus, from a radius of 2½ inch to about 4 inches, the mass per unit area is below average, increasing to and advancing above average as the 4 inch radius is passed. This increase continues up to a radius of somewhat below 6 inches, so that the mass per unit area in this band is, again, above average. Another rapid drop provided by additional rows of perforations occurs at the slightly below 6 inch radius, and from this radius outward the average mass per unit area remains below the overall plate average, although it varies up and down to some extent. Adjacent the periphery of the plate the hole spacings are intentionally formed to provide a generally increasing mass toward the rim in the radial outward direction in particular from the radius of approximately 7½ inches to the plate's edge.

The results of the described features of the perforation pattern are shown in FIGS. 7 and 8, where there are graphically represented the results of temperature measurements on new and old design plates under comparable transient engine load change conditions. FIG. 7 represents a temperature increasing transient condition at a predetermined interval of time after an engine power increase during the period when the plate temperature is increasing, but has not yet stabilized. It is seen that the temperature of the old design plate indicated by dashed line 40 is fairly constant from the center to a point about 4 inches from the outer edge, or rim, from which point the temperature decreases with increasing rapidity to the edge of the plate where the temperature approximates 400°, or 370° lower than at the plate center. By comparison, the new design plate according to the present invention as indicated by the solid line 42 has, under a comparable condition, a temperature at its center close to that of the standard plate, and the plate temperature varies slightly upwardly and downwardly at radial positions outward from the center to a point about one inch from the rim where the temperature drops rapidly from a maximum of about 800° to about 540° at the edge. It is seen that the varying temperature levels of the new design plate, caused by the varying mass created by the novel perforation pattern, permit heat flow during this transient condition in both directions from the high temperature portions of the plate to the lower temperature portions. This, combined with the increasing mass per unit area approaching the plate edge, results in the edge or rim temperature of the new design plate being considerably closer to that of the plate center than is true of the old design plate. Since it is considered that stresses developed at the plate edge are measured largely as a function of the area between the curve and the lower extreme temperature at the rim, it is seen that the stresses produced in the new design plate will be substantially lower than those of the old plate design, where the differences in the plate rim and center temperatures are much greater than is found with the new design.

FIG. 8 shows the somewhat similar results measured in a case where transient plate temperature conditions were caused by a decrease in engine power. The measured results under comparable conditions show a substantially smaller stress level in the new design plate, represented by the solid line 44, where the center and rim temperatures are substantially closer together than in the old design plate represented by dashed line 46. By these results, the effectiveness of the radially variable mass per unit area perforation pattern to accomplish reduced transient operational stresses at the supported edge of the turbine inlet screen 32, as compared to the previous design screen, is clearly illustrated. In addition, the annular positioning of the outer row of perforations which are spaced evenly from the plate edge result in a much more even distribution of stresses around the edge of the plate and thus minimize the likelihood of plate failure at any one specific point around the edge. Substantially longer operating life is accordingly anticipated from turbine inlet screens made according to the present invention than from those which have been made according to the previous design.

While the invention has been described by reference to a particular embodiment chosen for purposes of illustration, it should be understood that numerous changes could be made in the specific arrangements of perforation patterns and the like without departing from the basic teachings of the invention as disclosed herein. Accordingly, it is intended that the invention not be limited by the specific disclosure, but that it have the full scope permitted by the language of the following claims.

What is claimed is:

1. A turbine inlet screen for use with an internal combustion engine having an exhaust gas driven turbine to cover the inlet to such turbine to protect it from potentially damaging particulate matter in the exhaust gases, said screen being adapted to be rigidly secured to an annular edge of support means in a gas flow path defined by a housing with said screen being spaced radially from said housing to permit its thermal expansion relative to said housing, said housing being adapted to be mounted at the inlet to such turbine, said screen comprising a circular metal plate having a solid edge and perforated inwardly of the edge in a pattern extending over substantially the entire remaining surface of said plate, said pattern including spaced central and peripheral portions with at least one intermediate portion therebetween, said peripheral portion having rings of perforations concentric with said edge, said pattern varying in its various portions in the proportion of remaining plate area unoccupied by perforations such that said proportion is greater than the overall plate average in said central portion, smaller than average in said intermediate portion and has in said peripheral portion an increasing value with increasing radius adjacent said edge, whereby the transient heating and cooling rates of the central portion and said edge of the plate are respectively substantially lower than those of said one intermediate portion and of the parts of said peripheral portion inwardly adjacent to said edge.

2. A turbine inlet screen according to claim 1 and further including additional intermediate portions between said central and peripheral portions and having proportions of remaining plate area unoccupied by perforations which vary radially both above and below the overall plate average.

3. A turbine inlet screen for use with an internal combustion engine having an exhaust gas driven turbine to cover the inlet to such turbine to protect it from potentially damaging particulate matter in the exhaust gases, said screen being adapted to be rigidly secured to an annular edge of support means in a gas flow path defined by a housing with said screen being spaced radially from said housing to permit its thermal expansion relative to said housing, said housing being adapted to be mounted at the inlet to such turbine, said screen comprising a circular metal plate having a solid edge and perforated inwardly of the edge in a pattern consisting of rings of perforations concentric with said edge and extending over substantially the entire remaining surface of said plate, said pattern including spaced central and peripheral portions with at least one intermediate portion therebetween, said pattern varying in its various portions in the proportion of remaining plate area unoccupied by perforations such that said proportion is greater than the overall plate average in said central portion, smaller than average in said intermediate portion and has in said peripheral portion an increasing value with increasing radius adjacent said edge, whereby the transient heating and cooling rates of the central portion and said edge of the plate are respectively substantially lower than those of said one intermediate portion and the part of said peripheral portion inwardly adjacent to said edge.

4. A turbine inlet screen according to claim 3 and further including additional intermediate portions between said central and peripheral portions and having proportions of remaining plate area unoccupied by perforations which vary radially both above and below the overall plate average.

* * * * *